(12) United States Patent
Dahl et al.

(10) Patent No.: US 7,691,223 B2
(45) Date of Patent: Apr. 6, 2010

(54) APPARATUS AND METHOD FOR MAKING FIBER REINFORCED SHEET MOLDING COMPOUND

(75) Inventors: Jeffrey Dahl, Livonia, MI (US); Glen L. Smith, Dearborn, MI (US); Raymond Silva, Maumee, OH (US); Carl Johnson, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 694 days.

(21) Appl. No.: 11/627,097

(22) Filed: Jan. 25, 2007

(65) Prior Publication Data
US 2008/0178985 A1 Jul. 31, 2008

(51) Int. Cl.
*B32B 38/04* (2006.01)
*B32B 37/24* (2006.01)
*B29C 65/70* (2006.01)
*C08J 5/04* (2006.01)
*B26D 7/00* (2006.01)

(52) U.S. Cl. .................. 156/289; 156/242; 156/250; 156/256; 156/307.1; 156/510; 156/516; 156/517; 156/519; 156/537; 83/28; 83/167

(58) Field of Classification Search .............. 156/242, 156/250, 256, 289, 307.1, 510, 516, 517, 156/519, 537; 83/28, 167
See application file for complete search history.

(56) References Cited

U.S. PATENT DOCUMENTS

| | | | | |
|---|---|---|---|---|
| 2,153,031 A | * | 4/1939 | Zetzsche et al. | 264/143 |
| 2,221,022 A | * | 11/1940 | Ellis | 83/174 |
| 2,221,716 A | * | 11/1940 | Morton | 83/19 |
| 2,248,806 A | * | 7/1941 | Campbell | 19/51 |
| 2,278,032 A | * | 3/1942 | Youngman | 83/271 |
| 2,499,175 A | * | 2/1950 | Wilkie | 19/66 R |
| 2,719,336 A | * | 10/1955 | Stotler | 19/51 |
| 2,953,849 A | * | 9/1960 | Morgan | 29/419.1 |
| 3,017,684 A | * | 1/1962 | Pittman | 28/167 |
| 3,042,570 A | | 7/1962 | Bradt | |
| 3,045,520 A | * | 7/1962 | Haruyama | 83/732 |

(Continued)

FOREIGN PATENT DOCUMENTS

GB 2 045 700 A 11/1980

(Continued)

*Primary Examiner*—Philip C Tucker
*Assistant Examiner*—Sing P Chan
(74) *Attorney, Agent, or Firm*—Raymond L. Coppiellie; Brooks Kushman P.C.

(57) ABSTRACT

An apparatus for making SMC comprising a conveyor belt assembly having a feed end and a transfer end. The conveyor belt assembly including a belt having an outer surface and an inner surface. A cutting support structure disposed between the feed end and the transfer end, and in contact with the inner surface. A cutting wheel having a perimeter surface and disposed adjacent to the cutting support structure. A feed tension member proximate the outer surface and disposed between the feed end and the cutting wheel. The feed tension member positions the fiber rovings onto the outer surface to be cut by the cutting wheel. The feed tension member, cutting wheel and belt cooperate to feed the fiber rovings at a feed rate, cut the fiber rovings into a plurality of parallel discontinuous fibers, and convey the fibers at substantially the same rate as the feed rate.

20 Claims, 5 Drawing Sheets

U.S. PATENT DOCUMENTS

| | | | |
|---|---|---|---|
| 3,061,496 A * | 10/1962 | Meyer | 156/276 |
| 3,164,047 A * | 1/1965 | Spicer et al. | 83/23 |
| 3,478,392 A * | 11/1969 | Abdel-Moniem Gorrafa | 19/62 |
| 3,586,573 A * | 6/1971 | Vissers | 156/500 |
| 3,614,936 A * | 10/1971 | Philipps | 112/420 |
| 3,639,202 A * | 2/1972 | Simon | 442/148 |
| 3,847,707 A * | 11/1974 | Meyer et al. | 156/436 |
| 3,898,113 A * | 8/1975 | Meyer et al. | 156/62.4 |
| 3,921,874 A | 11/1975 | Spain | |
| 3,943,805 A | 3/1976 | Lubitzsch | |
| 3,947,605 A * | 3/1976 | Chao | 426/656 |
| 4,035,790 A * | 7/1977 | Farmer | 241/36 |
| 4,104,765 A * | 8/1978 | Lehner | 19/6 |
| 4,278,491 A * | 7/1981 | Morse | 156/501 |
| 4,282,049 A * | 8/1981 | Morse | 156/62.2 |
| 4,294,490 A | 10/1981 | Woelfel | |
| 4,294,639 A | 10/1981 | Woelfel et al. | |
| 4,376,749 A | 3/1983 | Woelfel | |
| 4,399,589 A * | 8/1983 | Hefti | 19/6 |
| 4,474,845 A | 10/1984 | Hagerman et al. | |
| 4,514,013 A | 4/1985 | Woelfel et al. | |
| 4,583,933 A | 4/1986 | Woelfel et al. | |
| 4,643,126 A | 2/1987 | Wilkinson et al. | |
| 4,702,872 A * | 10/1987 | Yamamoto et al. | 264/114 |
| 4,740,668 A * | 4/1988 | Perez | 219/121.39 |
| RE32,949 E | 6/1989 | Woelfel et al. | |
| 4,883,624 A * | 11/1989 | Spaay | 264/112 |
| 5,074,945 A | 12/1991 | Schaefer et al. | |
| 5,225,140 A * | 7/1993 | Hayashikoshi et al. | 264/571 |
| 5,270,357 A * | 12/1993 | Hesse et al. | 523/526 |
| 5,403,631 A * | 4/1995 | Sato et al. | 428/15 |
| 5,408,013 A * | 4/1995 | Kawakami et al. | 525/445 |
| 5,518,577 A * | 5/1996 | Jinbo et al. | 156/549 |
| 5,697,560 A * | 12/1997 | Bennett | 241/29 |
| 5,806,387 A | 9/1998 | Jander | |
| 5,834,547 A * | 11/1998 | Takabatake et al. | 524/321 |
| 5,935,289 A * | 8/1999 | Arterburn et al. | 65/471 |
| 6,076,442 A * | 6/2000 | Arterburn et al. | 83/13 |
| 6,508,906 B1 * | 1/2003 | Bradish | 156/285 |
| 6,848,159 B2 * | 2/2005 | Bascom et al. | 29/402.08 |
| 6,854,369 B2 * | 2/2005 | Allwein et al. | 83/19 |
| 2003/0194933 A1 * | 10/2003 | Patel | 442/149 |
| 2004/0089966 A1 * | 5/2004 | Kindle et al. | 264/69 |
| 2004/0124556 A1 | 7/2004 | Hawley | |
| 2006/0006571 A1 * | 1/2006 | Kindle et al. | 264/69 |
| 2006/0006572 A1 * | 1/2006 | Kindle et al. | 264/69 |
| 2006/0267236 A1 * | 11/2006 | Thomason | 264/117 |

FOREIGN PATENT DOCUMENTS

| | | | |
|---|---|---|---|
| GB | 2 117 696 A | | 10/1983 |
| JP | 75007649 B | * | 3/1975 |
| JP | 58022133 A | * | 2/1983 |

* cited by examiner

APPARATUS AND METHOD FOR MAKING FIBER REINFORCED SHEET MOLDING COMPOUND

BACKGROUND OF THE INVENTION

1. Field of the Invention

The present invention relates generally to an apparatus and a method for making fiber reinforced sheet molding compound.

2. Background Art

Filler reinforced thermoset polymers are used in molding applications requiring high strength, light weight, dimensional stability, and corrosion resistance. They are generally molded in matched die sets where heat and pressure are applied to simultaneously cure or crosslink the polymer constituents and shape the desired article. Such articles may replace assemblies of several stamped or cast metal parts.

Many of the thermoset polymer compositions now used in making reinforced plastic components contain crosslinkable polyester resins. However, other viscous resin systems based on polymers, such as vinyl esters, epoxies, phenolics, silicones, phthalates, polyurethanes, etc., are used for their special properties to suit a particular application and may be employed in the practice of this invention.

Sheet molding compound (SMC) is generally defined as a composite molding material which may be made up of unsaturated polyester resin, a low profile thermoplastic polymer agent, an inert filler, a fiber reinforcement, metal oxide maturation aids and processing aids. Generally, the unsaturated polyester resin is the reaction product of polypropylene oxide, phthalic anhydride and maleic anhydride. These constituents are typically provided in solution with styrene monomer. Low profile agents that include such thermoplastic polymers as polymethylmethacrylate, polyvinyl acetate or polybutadienestyrene copolymer rubber are added to improve surface smoothness. The inert filler is usually calcium carbonate, i.e., ground limestone. The fibrous filler is generally chopped fiberglass rovings in lengths of about 0.25 to 2 inches, wherein each roving containing several hundred individual fibers loosely bound together by a starch-like binder. This binder is sometimes referred to as a sizing.

SMC is generally made in a machine specifically designed for such a purpose. A sheet of SMC is produced by applying a thin layer of a low viscosity mixture of resin-styrene monomer and other ingredients onto a continuous, styrene-impermeable, carrier film of polyethylene or other suitable material. The glass fibers are then randomly laid on top of the resin layer. A second layer of the resin mixture is applied over the fiberglass layer and a second protective film is laid on top of it. The resulting sandwich of resin and glass between protective carrier films is then carefully rolled to knead the resin mixture into the glass fibers for proper wet-out. This kneading action must be very gentle as the viscosity of the constituents is relatively low at this time. Application of any substantial compression will cause the resin mixture to ooze out between the edges of the protective films.

The final step of SMC preparation is to coil or fold the just made compound into rolls, and allow them to maturate under controlled temperature conditions (preferably near room temperature, approximately 30° C.) for several days. SMC maturation is generally defined as a process in which the metal oxides react with the free organic acid groups of the polyester constituent to thicken it. Maturation is allowed to proceed to a point where the viscosity of the material has increased to the extent that it can be readily handled for molding and the surface is not too tacky. While metal oxides and hydroxides are the predominant maturation agents, isocyanates are sometimes used as thickeners via a urethane reaction with a polyester component. Alternatively, for an epoxy based SMC, the maturation mechanism may include B-staging, which is a partially completed chemical reaction, resulting in increased molecular weight of the polymer constituents without the occurrence of substantial crosslinking.

The protective films are first stripped from the compound before compression molding maturated SMC. The resin fiber composite, generally 2 to 8 millimeters in thickness, is then cut into suitably sized pieces and stacked into a "charge" of the proper geometry for a specific mold. The charge is placed into a matched metal die mold in a suitable compression molding press. Under typical molding conditions, a mold temperature of about 150° C. is maintained, a molding pressure of about 3.4 to 10.5 mega Pascals is applied, and the article is cured in place for 1 to 3 minutes.

Problems have been encountered in making reliable SMC parts for more rigorous structural applications. Generally SMC has a random fiber orientation which results in substantially isotropic material properties. The orientation of the fibers predominantly affects the strength and the modulus of the material. Current methods of manufacturing SMC do not lend themselves to producing SMC with a specific discontinuous fiber orientation. Accordingly, there is a need for an apparatus and a method for making a directionally oriented, discontinuous fiber reinforced sheet molding compound.

SUMMARY OF THE INVENTION

An apparatus is provided for making fiber reinforced sheet molding compound from a plurality of continuous fiber rovings. The apparatus comprises a conveyor belt assembly having a feed end and an transfer end. The conveyor belt assembly includes a belt having an outer surface and an inner surface. The outer surface is configured for conveying the fiber rovings from the feed end to the transfer end. A cutting support structure is disposed between the feed end and the transfer end, and is in contact with the inner surface of the belt. The conveyor belt assembly further comprises a cutting wheel having a perimeter surface including a plurality of spaced apart cutting blades, which is configured for rotating about a transverse axis. The cutting wheel is disposed adjacent to the cutting support structure with the perimeter surface of the cutting wheel in contact with the outer surface of the belt. A feed tension member is disposed between the feed end and the cutting wheel proximate the outer surface. The feed tension member positions the fiber rovings directly onto the outer surface in a substantially parallel machine direction, wherein the feed tension member, the cutting wheel and the belt cooperate to feed the fiber rovings to the cutting wheel at a feed rate, cut the fiber rovings into a plurality of parallel discontinuous fibers, and convey the parallel discontinuous fibers to the transfer end at substantially the same rate as the feed rate.

In another embodiment, an apparatus is provided for making fiber reinforced sheet molding compound from a plurality of continuous fiber rovings. The apparatus comprises a conveyor belt assembly having a feed end and transfer end. The conveyor belt assembly includes a belt having an outer surface and an inner surface. The conveyor belt is configured to convey the fiber rovings from the feed end to the transfer end. The belt includes an elastomer. A cutting support structure is disposed between the feed end and the transfer end. The cutting support structure includes a substantially flat plate which is in contact with the inner surface of the belt. The apparatus further comprises a cutting wheel having a perimeter surface including a plurality of spaced apart cutting blades. The cutting wheel is configured for rotating about a transverse axis and is disposed adjacent to the flat plate. The perimeter surface of the cutting wheel is in contact with the outer surface of the belt, whereby rotation of the cutting wheel drives movement of the belt, wherein the cutting blades are substantially between 0° to 5° offset from the transverse axis. A feed tension roller is disposed adjacent to the flat plate, between the feed end and the cutting wheel proximate the outer surface of the belt. The feed tension roller positions the fiber rovings directly onto the outer surface in a substantially parallel machine direction, wherein the feed tension roller, the cutting wheel and the belt cooperate to feed the fiber rovings to the cutting wheel at a feed rate, cut the fiber rovings into a plurality of parallel discontinuous fibers, and convey the parallel discontinuous fibers to the transfer end at substantially the same rate as the feed rate.

In another embodiment, a method for making a fiber reinforced sheet molding compound from a plurality of continuous fiber rovings is provided. The method comprises feeding the fiber rovings to a rotating cutting wheel at a feed rate. Feeding the fiber rovings includes guiding the fiber rovings to a feed tension member, positioning the fiber rovings directly onto a conveyor belt in a substantially parallel machine direction, and conveying the parallel fiber rovings to the cutting wheel which is rotating about a transverse axis. The method further comprises cutting the parallel fiber rovings into a plurality of parallel discontinuous fibers. The parallel discontinuous fibers are conveyed to a first release film at substantially the same rate as the feed rate.

DETAILED DESCRIPTION OF THE PREFERRED EMBODIMENT(S)

Detailed embodiments of the present invention are disclosed herein. It is understood, however, that the disclosed embodiments are merely exemplary of the invention and may be embodied in various and alternative forms. The figures are not necessarily to scale, some figures may be exaggerated or minimized to show the details of the particular component. Therefore, specific structural and functional details disclosed herein are not to be interpreted as limiting, but merely as a representative basis for the claims and/or as a representative basis for teaching one skilled in the art to practice the present invention.

Figure 1:
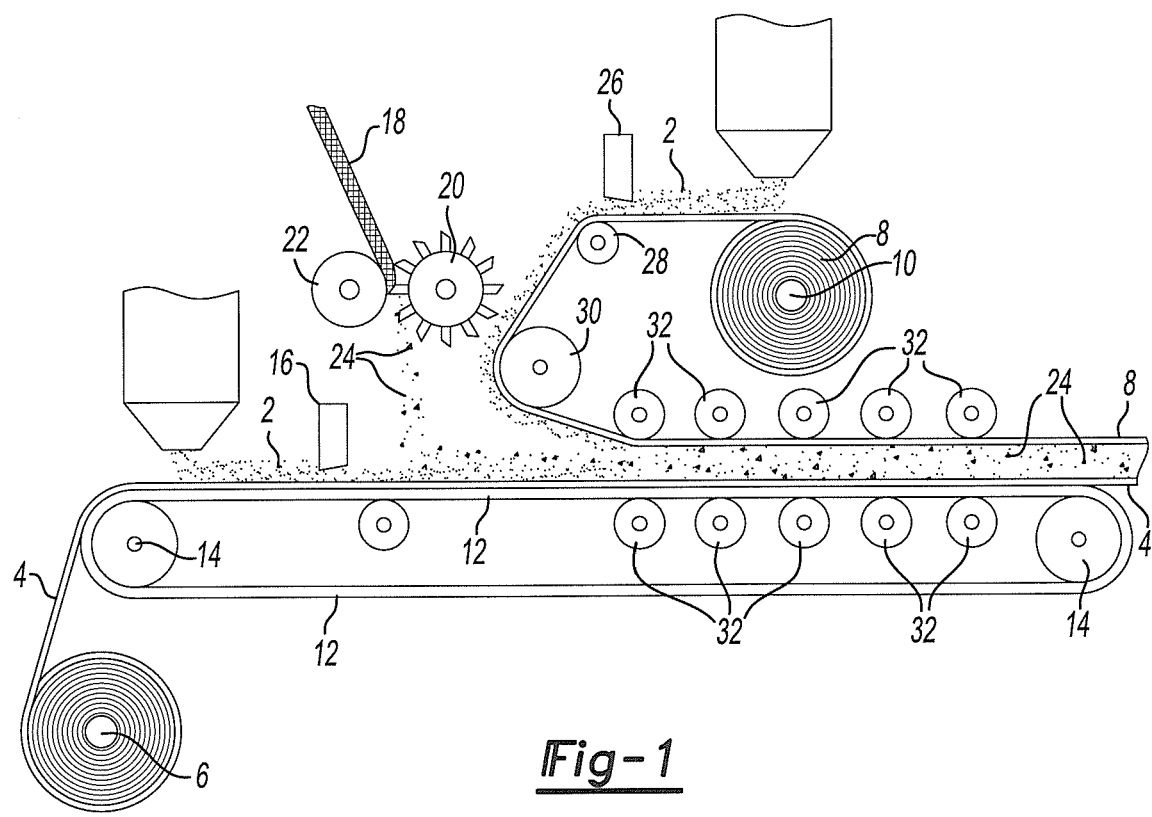
FIG. 1 is a side view of a SMC machine used to produce SMC laminate.

Referring to FIG. 1, a side view of a machine used for making SMC is provided. A resin compound 2, also referred to as SMC paste, is dispensed onto a lower polyethylene film 4 played out from reel 6. The resin compound is also dispensed separately onto an upper polyethylene film 8 played out from reel 10. Film 4 is carried on a lower endless belt 12 which travels around rotating end rollers 14. A first layer of resin compound 2 is laid onto the lower polyethylene sheet 4 and is conveyed under a doctor blade 16. A plurality of fiberglass rovings 18 are fed through a cutter comprising a chopping wheel 20 and a cot roller 22 where they are cut into chopped fibers 24 that are approximately 1 to 2 inches in length. The chopped fibers 24 fall onto the layers of resin 2 carried on the lower polyethylene film 4. A second layer of resin compound 2 is then deposited onto the upper polyethylene sheet 8 and carried under a doctor blade 26 around a tensioning roller 28 and a guide roller 30 to a first pair of nip rollers 32 where the SMC sandwich is formed. The SMC is then carried through several pairs of nip rollers 32 that even out the thickness of the sheet. Only a limited amount of pressure can be applied by these nip rollers or the resin 2 will ooze out between the polyethylene sheets 4 and 8.

Figure 2:
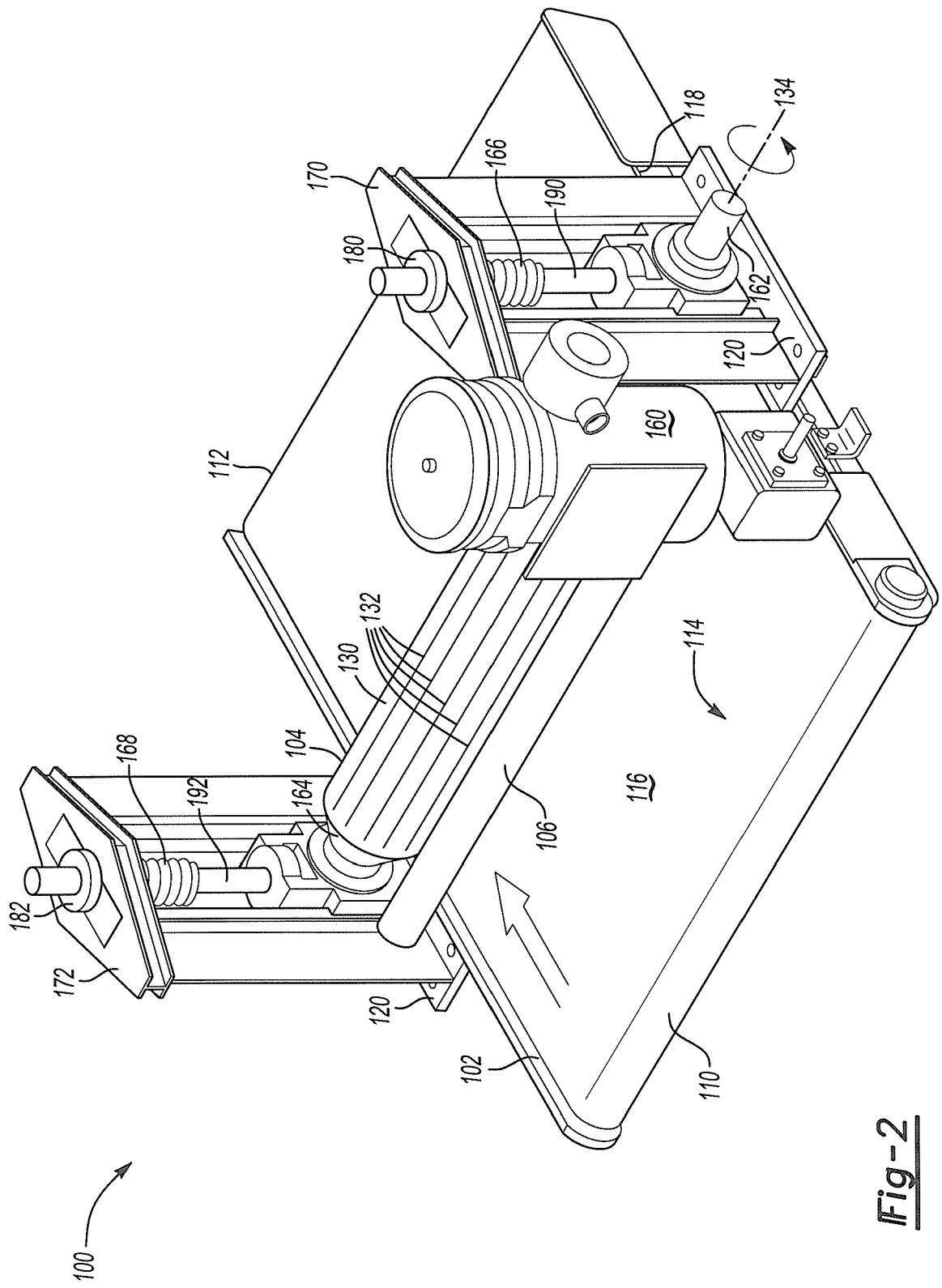
FIG. 2 is a perspective view of an apparatus for producing parallel discontinuous fibers for SMC in accordance with an embodiment of the present invention.

Referring to FIG. 2, a perspective view of an apparatus 100 used to produce parallel discontinuous fibers for SMC in accordance with an embodiment of the present invention is provided. The apparatus 100 comprises a conveyor belt assembly 102, a cutting wheel 104 and a feed tensioning member 106.

The conveyor belt assembly 102 has a feed end 110 and an opposite transfer end 112. The conveyor belt assembly 102 includes a belt 114 having an outer surface 116 and an opposite inner surface 118. The conveyor belt assembly 102 is configured for endlessly conveying in a machine direction from the feed end 110 to the transfer end 112.

The belt 114 may be made of a tough material such as an elastomer, which is resistant to being damaged by razor sharp cutting blades. In at least one embodiment, the belt is made from a polyurethane elastomer with a Shore A hardness substantially between 75 and 95. In at least one embodiment, the belt has a thickness which is substantially between 2 and 4 millimeters.

The conveyor belt assembly 102 further includes a cutting support structure 120. The cutting support structure 120 is disposed between the feed end 110 and the transfer end 112 and is in contact with the inner surface 118 of the belt 114. The cutting support structure 120 may include a substantially flat plate that provides support for the belt 114. The plate may be made of metal or any other suitable structural material capable of providing support against the force applied by the cutting wheel 104. The substantially flat plate may also be a substantially flat portion of a larger contoured structure.

The cutting wheel 104 has a perimeter surface 130 including a plurality of spaced apart cutting blades 132. In at least one embodiment, the perimeter surface 130 of the cutting wheel 104 is interposed with the outwardly extending portions of the cutting blades 132. The cutting blades 132 may also be formed to be integral with the cutting wheel 104.

The cutting wheel 104 is configured to rotate about a transverse axis 134. The cutting wheel 104 is disposed adjacent to the cutting support structure 120 with the perimeter surface 130 in contact with the outer surface 116. Rotation of the cutting wheel 104 may drive movement of the belt 114. Alternatively, movement of the belt 114 may drive rotation of the cutting wheel 104. The cutting support structure 120 provides cutting support for the cutting wheel 104.

The feed tension member 106 is proximate the outer surface 116 and is disposed between the feed end 110 and the cutting wheel 104. The feed tension member 106 may include a roller disposed adjacent to the flat plate portion of the support structure 120. The feed tension member 106 may rotationally interact with the fiber rovings and apply pressure to the belt.

Figure 3:
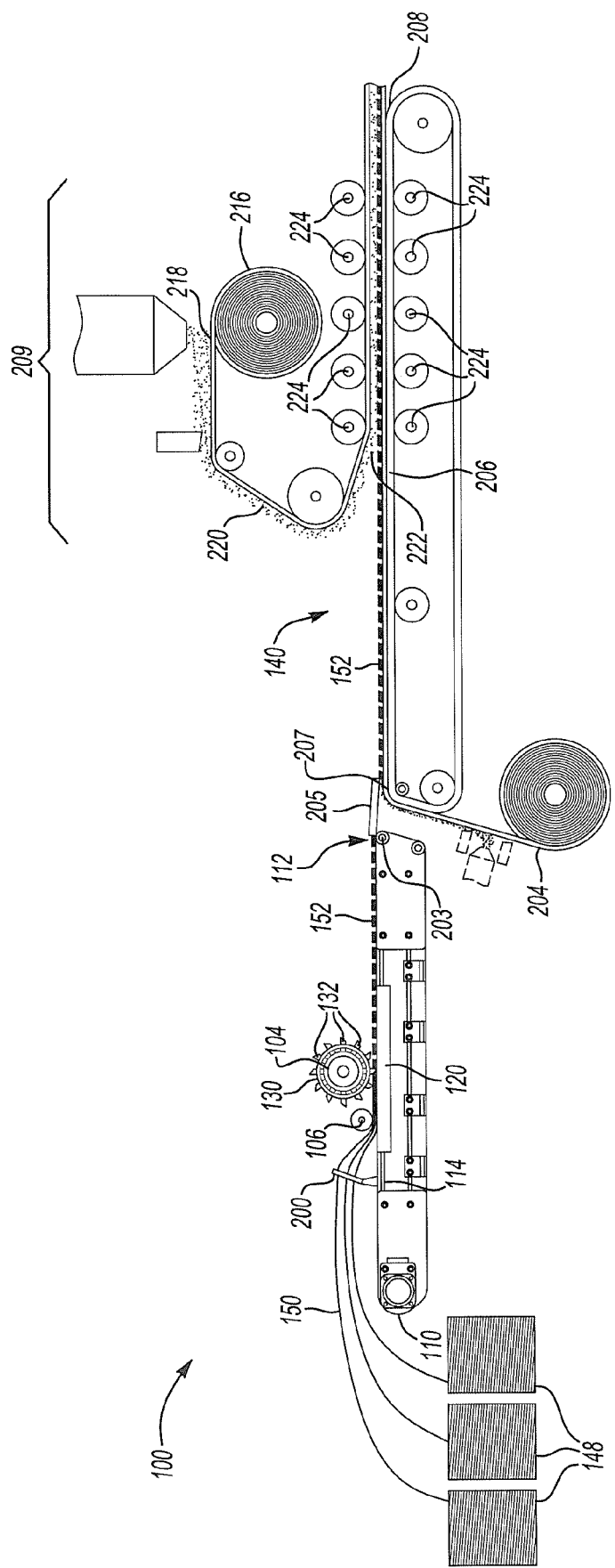
FIG. 3 is a side view of an apparatus for producing DD-SMC laminate in accordance with an embodiment of the present invention.

Referring now to FIGS. 2 and 3. The apparatus 100 may include an interfacing modified SMC machine. In this arrangement, the SMC machine serves as a laminating assembly 140 for incorporating the parallel discontinuous fibers into an SMC sandwich with an SMC paste to form a laminated directionally oriented, discontinuous sheet molding compound (DD-SMC) sheet.

The feed tension member 106 positions the fiber rovings 150 directly onto the outer surface 116 in a substantially parallel machine direction. A substantially parallel machine direction means that the majority of fiber rovings 150 are generally aligned with the belt's 114 conveying direction. The feed tension member 106, and the belt 114 cooperate to feed the fiber rovings 150 to the cutting wheel 104 at a selected feed rate. The cutting wheel 104 cuts the fiber rovings into a plurality of parallel discontinuous fibers 152. The belt conveys the parallel discontinuous fibers 152 to the transfer end 112 at substantially the same rate as the feed rate. The term parallel is to be understood in terms of unidirectional reinforced composite materials, where the majority of reinforcing fibers are generally aligned end to end in a certain direction to provide anisotropic material properties.

The fiber rovings 150 are placed directly onto the belt 114 that is supported by the cutting support structure 120. The belt 114 and fiber rovings 150 maintain a substantially equivalent feed and transfer rate by cooperation of the feed tension member 106, cutting wheel 104 and the belt 114. The feed and transfer rates are maintained in equivalents so that the fiber roving 120 may be cut without a substantial gap between the cut ends. A SMC sheet having substantially no gap between the cut fiber ends provides enhanced unidirectional structural properties, because the fiber reinforcement is substantially without resin rich stress concentrators between the fiber ends.

The cutting wheel 104 may have a first end 162 and an opposite second end 164. The apparatus 100 may further comprise a first spring assembly 166 and a second spring assembly 168, and a first and a second support frame 170 and 172.

The first and the second support frames 170 and 172 may be attached either directly or indirectly to the cutting support structure 120 with the belt 114 being disposed between the support frames 170 and 172. The first and the second spring assemblies 166 and 168 may each have upper ends 180 and 182 that are attached to the first and the second support frames 170 and 172, respectively. The spring assemblies 166 and 168 may each have lower ends 190 and 192, respectively, to which the first and the second ends of the cutting wheel 162 and 164 are rotationally connected.

The spring assemblies 166 and 168 may be, for example, mechanical compression springs. Alternatively, the springs may be pneumatic cylinders or any other suitable device capable of providing a compliant force as is well known to those skilled in the art. In at least one embodiment, the cutting wheel 104 has a length of 28 inches with cutting blades 132 extending outwardly from the cutting wheel 104 by 2 mm. In this embodiment, spring assemblies 166 and 168 may have a compressive spring constant of 680 lb/in. The spring assemblies 166 and 168 allow for 1 to 2 mm up/down travel of the cutting wheel 104 as it rotates about the transverse axis 134.

A motor 160 may be used to provide a rotational force to the cutting wheel 104 to drive movement of the belt 114. Alternatively, the motor 160 may be used to drive the belt 114 that indirectly drives rotational movement of the cutting wheel 104.

The fiber rovings 150 may be supplied from creels 148. The fiber rovings may be fiberglass, such as, E-glass, S-glass, and/or carbon fibers, thermoplastic fibers, natural fibers or any other suitable fiber reinforcement known by those skilled in the art.

Figure 4:
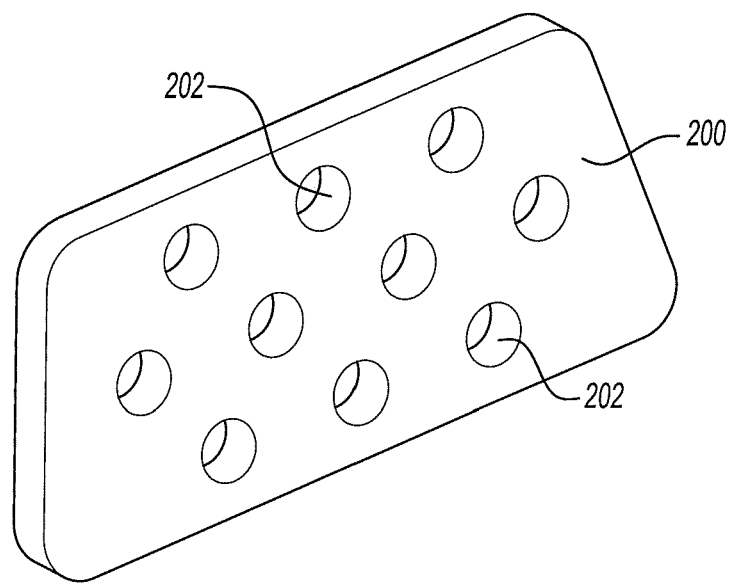
FIG. 4 is a front view of a guided eyelet plate in accordance with an embodiment of the present invention.

The fiber rovings 150 may be guided to the feed tension member 106 by an eyelet guide plate 200. The eyelet guide plate 200 is illustrated in FIG. 4 and may be disposed between the feed tension member 106 and the feed end 110. The eyelet guide plate 200 defines a plurality of holes 202 through which the fiber rovings 150 are feed in a substantially parallel arrangement to the feed tension member 106. The eyelet guide plate 200 and feed tension member 106 cooperate to provide a substantially even distribution of the fiber rovings onto the belt 114.

Referring back to FIGS. 2 and 3, the feed tension member 106 may include an adjustable roller. For example, the roller of the feed tension member 106 may be adjusted to apply a limited amount of pressure to the belt 114. The pressure is limited to allow the fiber rovings 150 to maintain a substantially parallel and even distribution without impeding the feed rate while being fed to the cutting wheel 104.

The conveyor belt assembly 102 may include a transfer pulley 203 that is disposed adjacent to the transfer end 112 and is in contact with the inner surface 118 of the belt 114. In at least one embodiment, the transfer pulley 203 has a radius less than 13 millimeters, which facilitates transfer of the parallel discontinuous fibers 152 onto a first release film 204.

The apparatus 100 may further comprise the transfer slide 205 disposed adjacent to the transfer end 112 and in contact with the outer surface 116 of the belt 114. The transfer slide 205 transfers parallel discontinuous fibers 152 from the belt 114 onto the first release film 204 in a substantially parallel direction. The transfer slide 205 may provide an incline such that the parallel discontinuous fibers 152 slide onto the release film 204 with the assistance of gravitational force. In at least one embodiment, no SMC paste is applied to the first release film 204 prior to the parallel discontinuous fibers 152 being transferred onto the first release film 204. In at least one other embodiment, SMC paste is applied to the first release film 204 and the parallel discontinuous fibers 152 are transferred directly onto the SMC paste.

In at least one embodiment, a laminating assembly 140 includes an endless belt 206 configured for conveying the SMC sheet as it is laminated from the receiving end 207 to a discharge end 208. The receiving end 207 is proximate the transfer end 112 and configured to receive both the first release film 204 and the parallel discontinuous fibers 152 from the transfer end 112 at substantially the same rate as the feed rate. The parallel discontinuous fibers may be deposited on the first release film 204 which is in contact with the endless belt 206.

The laminating assembly 140 may further comprise a laminating portion 209 disposed between the receiving end 207 and the discharge end 208. The laminating portion 209 may be configured to receive a second release film 216 having an inside surface 218 on which is applied a layer of SMC paste 220. The second release film 216 may be laminated to the parallel discontinuous fibers 152 such that the parallel discontinuous fibers 152 are disposed between the first and the second release films 204 and 216 and in contact with the SMC paste 220 to form a laminated DD-SMC sheet 222. The laminated DD-SMC sheet 222 may be kneaded by nip rollers 224 in order to wet-out the parallel discontinuous fibers 152.

Figure 5:
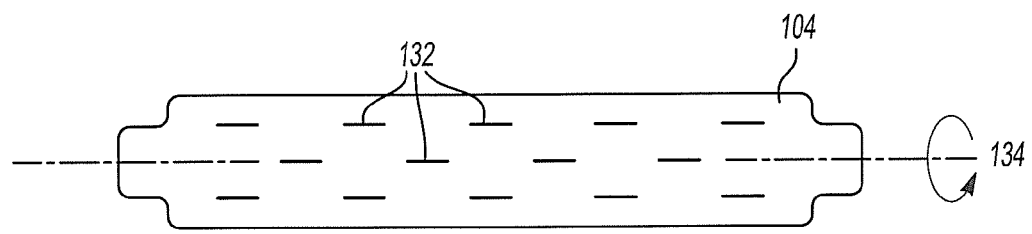
FIG. 5 is a front view of a cutting wheel in accordance with an embodiment of the present invention.

Referring to FIG. 5, a cutting wheel 104 is provided that has cutting blades 132 in a notched staggered configuration which is substantially parallel with the transverse axis 134.

Figure 6:
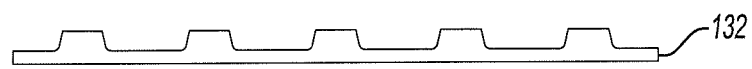
FIG. 6 is a front view of a blade used in FIG. 5 in accordance with an embodiment of the present invention.

Referring to FIG. 6 one of the cutting blades 132 is shown with the notched configuration. In at least one embodiment, the blades 132 are razor sharp and made of hardened steel with a hardness of about $R_c$ 60-64. Other suitable blades known in the art may also be used.

Figure 7:
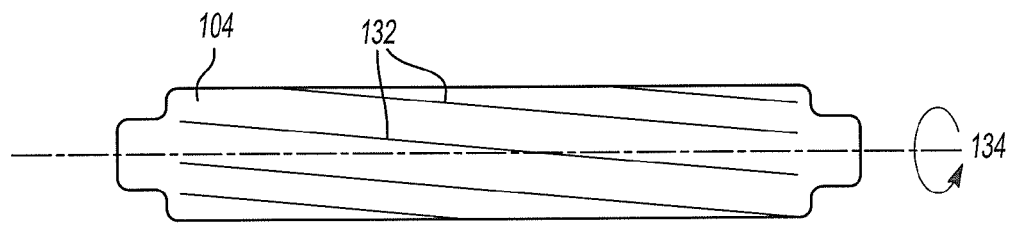
FIG. 7 is a front view of a cutting wheel in accordance with an embodiment of the present invention.

Referring to FIG. 7, one embodiment of the cutting wheel 104 is provided that has cutting blades 132 that may be offset substantially between 0 and 5 degrees from the transverse axis. A 0 degree offset corresponds to a parallel configuration, such as that shown in FIG. 5. An offset of greater than 0 degree is illustrated in FIG. 7.

Figure 8:
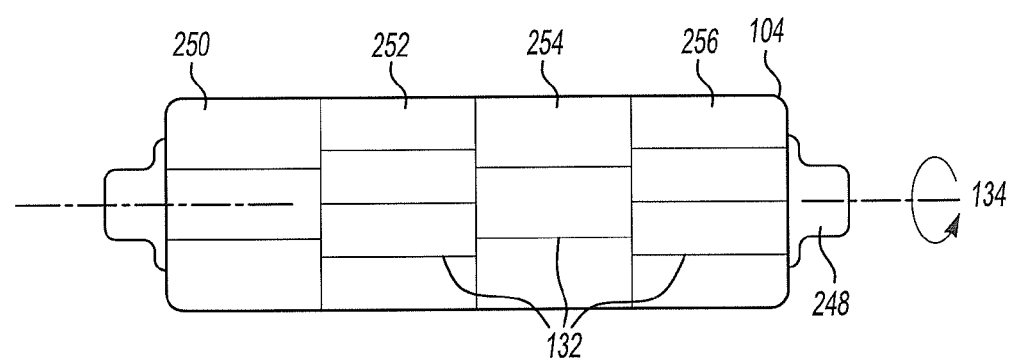
FIG. 8 is a front view of a cutting wheel in accordance with an embodiment of the present invention.

Referring to FIG. 8, a front view is provided of one embodiment of a cutting wheel 104. Here, modular cutting blade collars 150, 152, 154 and 156 are shown. The blades 132 may be substantially parallel or offset from the transverse axis 134. Moreover, the blades 132 of one modular unit may be staggered relative to each adjacent modular unit 150, 152, 154 and 156.

Figure 9:
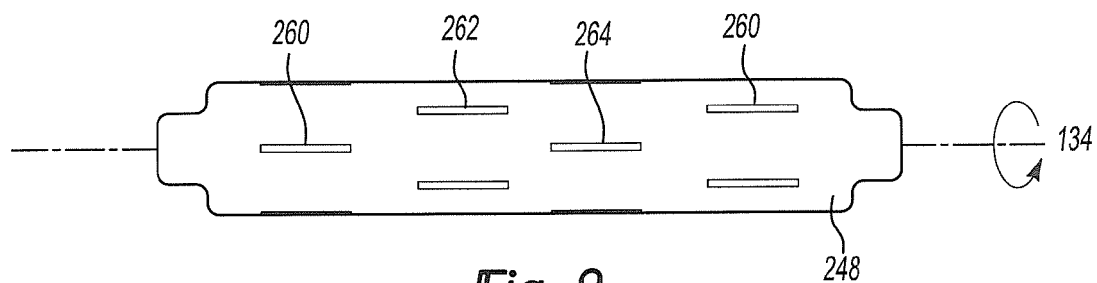
FIG. 9 is a front view of a cutting wheel mandrel used in FIG. 8 in accordance with an embodiment of the present invention.

Referring to FIG. 9, a front view is shown of a mandrel that locates the modular collars 150, 152, 154 and 156 of FIG. 6. Locating features 260, 262, 264 and 266 may be used to locate the modular collars 250, 252, 254 and 256.

Figure 10:
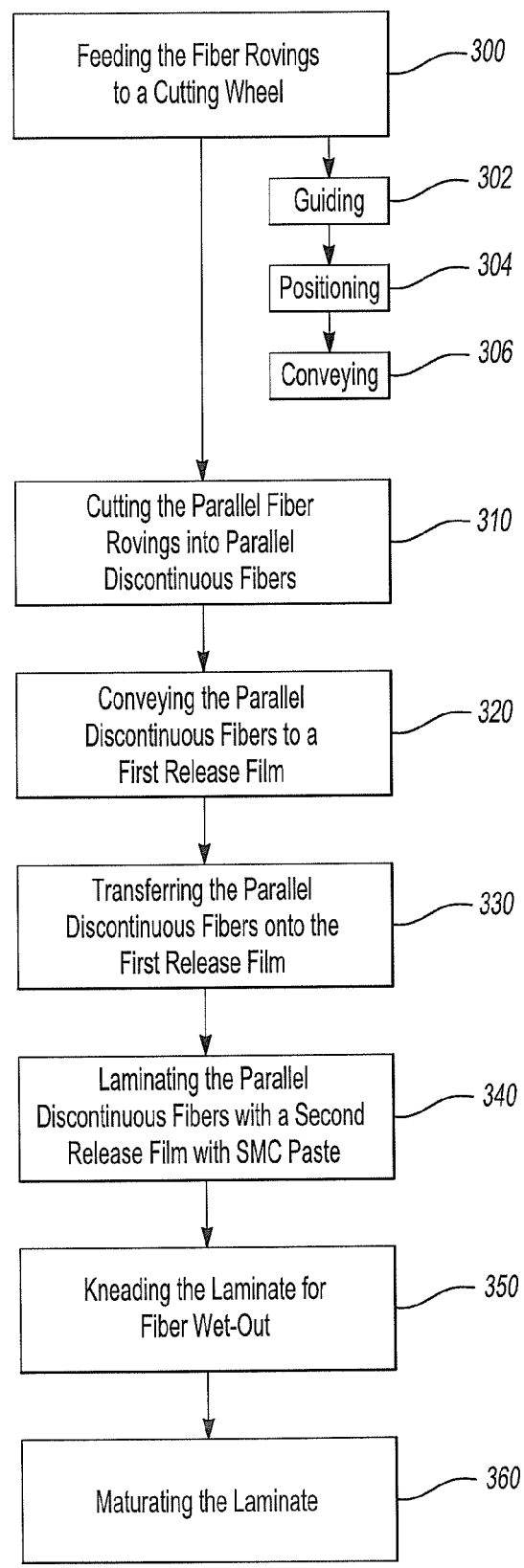
FIG. 10 is a flowchart of a method for making fiber reinforced sheet molding compound in accordance with an embodiment of the present invention.

Referring to FIG. 10, a method for making a fiber reinforced sheet molding compound from a plurality of continuous fiber rovings is illustrated by a flowchart. The method comprises feeding the fiber rovings to a rotating cutting wheel at 300 at a selected feed rate. The fiber rovings are fed by guiding the fiber rovings at 302 to a feed tension member, positioning the fiber rovings directly onto a conveyor belt at 304, such that, the fiber rovings are substantially parallel and evenly distributed, and conveying the parallel fiber rovings to the rotating cutting wheel at 306.

The method further comprises cutting the parallel fiber rovings at 310 into a plurality of parallel discontinuous fibers. The parallel discontinuous fibers are conveyed to a first release film at 320 at substantially the same rate as the feed rate.

The method may further comprise transferring the parallel discontinuous fibers onto a first release film at 340 at substantially the same rate as the feed rate. The parallel discontinuous fibers are laminated with a second release film at 340 with an inside surface of the second release file that is in contact with an SMC paste to form a laminated DD-SMC sheet. The SMC paste may have a viscosity substantially between 500 to 50,000 centipoises. The parallel discontinuous fibers are disposed between the first release film and the second release film and are in contact with the SMC paste.

The method may further comprise kneading the laminated DD-SMC sheet at 350 such that the parallel discontinuous fibers are wet-out by the SMC paste. The laminated DD-SMC sheet is maturated at 360 to a viscosity substantially between 5,000,000 and a 100,000,000 centipoises.

In at least one embodiment, the parallel discontinuous fibers are fiberglass with a length substantially between 0.25 and 4.00 inches. The SMC paste may include unsaturated polyester resin, styrene and metal oxides. Moreover, the step of maturating may occur at a temperature substantially between 15 to 35° C. for a time substantially between 1 and 7 days.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An apparatus for making fiber reinforced sheet molding compound from a plurality of continuous fiber rovings, the apparatus comprising:

a conveyor belt assembly having a feed end and a transfer end and including:
a belt having an outer surface and an inner surface, wherein the outer surface is configured to convey the fiber rovings to the transfer end; and
a cutting support structure disposed between the feed end and the transfer end, and in contact with the inner surface of the belt;
a cutting wheel having a perimeter surface including a plurality of spaced apart cutting blades, configured for rotating about a transverse axis and disposed adjacent to the cutting support structure with the perimeter surface in contact with the outer surface of the belt; and
a feed tension member disposed between the feed end and the cutting wheel proximate the outer surface, the feed tension member positions the fiber rovings directly onto the outer surface in a substantially parallel machine direction, wherein the feed tension member, the cutting wheel and the belt cooperate to feed the fiber rovings to the cutting wheel at a feed rate, cut the fibers rovings into a plurality of parallel discontinuous fibers and convey the parallel discontinuous fibers to the transfer end at substantially the same rate as the feed rate.

2. The apparatus of claim 1 wherein rotation of the cutting wheel drives movement of the belt.

3. The apparatus of claim 1 wherein movement of the belt drives rotation of the cutting wheel.

4. The apparatus of claim 1 wherein the cutting wheel has a first end and a second end and the apparatus further comprising:

a first spring assembly and a second spring assembly; and
a first support frame and a second support frame, wherein each support frame is attached to the cutting support structure, and wherein the belt is disposed between the support frames, the first spring assembly and the second spring assembly each have a first end respectively attached to the first and the second support frame and a second end operatively connected to the first and the second ends of the cutting wheel, respectively.

5. The apparatus of claim 1 further comprising a laminating assembly including:

an endless belt configured for conveying from a receiving end to a discharge end, wherein the receiving end is proximate the transfer end and configured to receive both a first release film and the parallel discontinuous fibers from the transfer end at substantially the same rate as the feed rate, wherein the parallel discontinuous fibers are disposed adjacent to the first release film which is in contact with the endless belt;
a laminating portion disposed between the receiving end and the discharge end and including a plurality of nip rollers disposed adjacent to the endless belt, the laminating portion configured to receive a second release film in contact with an SMC paste, laminate the second release film to the parallel discontinuous fibers such that the parallel discontinuous fibers are disposed between the first and second release films and in contact with the SMC paste to form a laminated DD-SMC sheet, and knead the laminated DD-SMC sheet by the nip rollers.

6. The apparatus of claim 1 wherein the cutting support structure includes a substantially flat plate in contact with the inner surface of the belt.

7. The apparatus of claim 1 wherein the belt has a thickness between the inner and the outer surface of substantially between 2 and 4 mm and includes a polyurethane elastomer with a Shore A hardness substantially between 75 and 95.

8. The apparatus of claim 1 wherein the feed tension member includes a roller disposed adjacent to the support structure and configured to rotationally interact with the fiber roving and to apply force to the belt.

9. The apparatus of claim 1 further comprising an eyelet guide plate disposed between the feed tension member and the feed end and defining a plurality of holes, wherein the fiber rovings are respectively matched and aligned with the holes such that the fiber rovings are feed in a parallel arrangement to the feed tension member for a substantially even distribution onto the belt.

10. The apparatus of claim 1 wherein the conveyor belt assembly includes a transfer pulley disposed adjacent to the transfer end and in contact with the inner surface, wherein the transfer pulley has a radius less than 13 mm.

11. The apparatus of claim 1 further comprising a transfer slide disposed adjacent to the transfer end and in contact with the outer surface, the transfer slide adapted for transferring the parallel discontinuous fibers from the belt onto a release film in a substantially parallel direction.

12. The apparatus of claim 1 wherein the cutting blades are substantially between 0 to 5 degrees offset from the transverse axis.

13. The apparatus of claim 1 wherein the cutting blades have a plurality of spaced apart notches.

14. The apparatus of claim 1 wherein the blades are spaced apart substantially between 0.25 to 4.00 inches.

15. An apparatus for making fiber reinforced sheet molding compound from a plurality of continuous fiber rovings, the apparatus comprising:
a conveyor belt assembly having a feed end and a transfer end and including:
a belt having an outer surface and an inner surface, wherein the outer surface is configured to convey the fiber rovings to the transfer end; and
a cutting support structure disposed between the feed end and the transfer end and including a substantially flat plate in contact with the inner surface;
a cutting wheel having a perimeter surface including a plurality of spaced apart cutting blades, the cutting wheel configured for rotating about a transverse axis and disposed adjacent to the flat plate with the perimeter surface in contact with the outer surface, whereby rotation of the cutting wheel drives movement of the belt, wherein the cutting blades are substantially between 0 to 5 degrees offset from the transverse axis; and
a feed tension roller disposed adjacent to the flat plate and between the feed end and the cutting wheel proximate the outer surface of the belt, the feed tension roller positions the fiber rovings directly onto the outer surface in a substantially parallel machine direction, wherein the feed tension roller, the cutting wheel and the belt cooperate to feed the fiber rovings to the cutting wheel at a feed rate, cut the fibers rovings into a plurality of parallel discontinuous fibers and convey the parallel discontinuous fibers to the transfer end at substantially the same rate as the feed rate.

16. The apparatus of claim 15 wherein the cutting wheel has a first end and a second end and the apparatus further comprising:
a first spring assembly and a second spring assembly; and
a first support frame and a second support frame, wherein each support frame is attached to the cutting support structure, and wherein the belt is disposed between the support frames, the first spring assembly and the second spring assembly each have a first end respectively attached to the first and the second support frame and a second end operatively connected to the first and the second ends of the cutting wheel, respectively.

17. The apparatus of claim 16 further comprising an eyelet guide plate disposed between the feed tension roller and the feed end and defining a plurality of holes, wherein the fiber rovings are respectively matched and aligned with the holes such that the fiber rovings are fed in a parallel arrangement to the feed tension roller for a substantially even distribution onto the belt.

18. A method for making fiber reinforced sheet molding compound from a plurality of continuous fiber rovings, the method comprising:
feeding the fiber rovings to a rotating cutting wheel at a feed rate, wherein feeding the fiber rovings includes:
guiding the fiber rovings to a feed tension member; wherein the feed tension member is disposed between a feed end of a conveyer belt and the cutting wheel;
positioning the fiber rovings directly onto the conveyer belt in a substantially parallel machine direction; and
conveying the parallel fiber rovings to the cutting wheel;
cutting the parallel fiber rovings into a plurality of parallel discontinuous fibers on the conveyer belt; and
conveying the parallel discontinuous fibers to a first release film at substantially the same rate as the feed rate.

19. The method of claim 18 further comprising:
transferring the parallel discontinuous fibers onto the first release film at substantially the same rate as the feed rate;
laminating the parallel discontinuous fibers with a second release film in contact with a layer of SMC paste to form a laminated DD-SMC sheet, wherein the SMC paste has a viscosity substantially between 500 to 50,000 centipoises, wherein the parallel discontinuous fibers are disposed between the first and the second release film and in contact with the SMC paste;
kneading the laminated DD-SMC sheet such that the parallel discontinuous fibers are wet-out by the SMC paste; and
maturating the laminated DD-SMC sheet to a viscosity substantially between 5,000,000 and 100,000,000 centipoises.

20. The method of claim 19 wherein the parallel discontinuous fibers are fiberglass with a length substantially between 0.25 to 4.00 inches, the SMC paste includes unsaturated polyester resin, styrene and metal oxides, and the step of maturating occurs at a temperature substantially between 15 to 35° C. for a time substantially between 1 and 7 days.

* * * * *